United States Patent
Rusanovskyy et al.

(10) Patent No.: US 10,681,358 B2
(45) Date of Patent: Jun. 9, 2020

(54) QUANTIZATION PARAMETER CONTROL FOR VIDEO CODING WITH JOINED PIXEL/TRANSFORM BASED QUANTIZATION

(71) Applicant: QUALCOMM Incorporated, San Diego, CA (US)

(72) Inventors: Dmytro Rusanovskyy, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/224,320

(22) Filed: Dec. 18, 2018

(65) Prior Publication Data
US 2019/0191172 A1    Jun. 20, 2019

Related U.S. Application Data

(60) Provisional application No. 62/607,887, filed on Dec. 19, 2017.

(51) Int. Cl.
*H04N 19/186* (2014.01)
*H04N 19/18* (2014.01)
(Continued)

(52) U.S. Cl.
CPC ........... *H04N 19/186* (2014.11); *G06T 5/008* (2013.01); *H04N 19/124* (2014.11);
(Continued)

(58) Field of Classification Search
CPC .... H04N 19/186; H04N 19/85; H04N 19/176; H04N 19/124; H04N 19/18; G06T 5/008
See application file for complete search history.

(56) References Cited

U.S. PATENT DOCUMENTS

2016/0309154 A1    10/2016    Rusanovskyy et al.
2018/0184088 A1*   6/2018    Byun ................... H04N 19/124

OTHER PUBLICATIONS

"High efficiency video coding; H.265 (Apr. 2015)," ITU-T Standard, International Telecommunication Union, Geneva; CH, No. H.265 (Apr. 2015), Apr. 29, 2015 (Apr. 29, 2015), pp. 1-634, XP044122996, [retrieved on Jul. 6, 2015], Section 8.6.1.

(Continued)

*Primary Examiner* — Nam D Pham
(74) *Attorney, Agent, or Firm* — Shumaker & Sieffert, P.A.

(57) ABSTRACT

A device for processing high dynamic range and/or wide color gamut (HDR/WCG) video data can be configured to determine a quantization parameter for quantized transform coefficients of a block of the HDR/WCG video data; inverse quantize the quantized transform coefficients based on the determined quantization parameter to determine dequantized transform coefficients; based on the dequantized transform coefficients, determine a block of residual values for the block of the HDR/WCG video data; based on the block of residual values, determine a reconstructed block for the block of the HDR/WCG video data; determine one or more dynamic range adjustment (DRA) parameters for the block of the HDR/WCG video data; adjust the one or more DRA parameters based on the determined quantization parameter to determine one or more adjusted DRA parameters; and perform DRA on the reconstructed block of the HDR/WCG video data using the one or more adjusted DRA parameters.

29 Claims, 12 Drawing Sheets

(51) Int. Cl.
*H04N 19/124* (2014.01)
*H04N 19/176* (2014.01)
*G06T 5/00* (2006.01)
*H04N 19/85* (2014.01)

(52) U.S. Cl.
CPC ........... *H04N 19/176* (2014.11); *H04N 19/18* (2014.11); *H04N 19/85* (2014.11); *G06T 2207/10024* (2013.01); *G06T 2207/20021* (2013.01)

(56) References Cited

OTHER PUBLICATIONS

International Search Report and Written Opinion—PCT/US2018/066476—ISA/EPO—dated Apr. 4, 2019.
Ramasubramonian A.K., et al., "Additional Information on HDR Video Coding Technology Proposal by Qualconm and Technicolor," 10.JVET Meeting, Apr. 10, 2018-Apr. 20, 2018; San Diego; (The Joint Video Exploration Team of ISO/IEC JTC1/SC29/WG11 and ITU-TSG.16), URL: http://phenix.int-evry.fr/jvet/ No. JVET-J0067, Apr. 3, 2018 (Apr. 3, 2018), pp. 1-7, XP030151258, Abstract, Sections 1-2, pp. 1-2.
"Signalling, Backward Compatibility and Display Adaptation for HDR/WCG video Coding; H.Sup18 (Oct. 2017)" ITU-T Standard H.SUP18, International Telecommunication Union, Geneva; CH, No. H.Sup18 (Oct. 2017), Oct. 27, 2017 (Oct. 27, 2017), 41 Pages, XP044243410, Retrieved from the Internet: URL: http://mirror.itu.int/dms/payfitu-t/rec/h/T-REC-H.Sup18-201710-I!!PDF-E.pdf [retrieved on Jan. 17, 2018].
Chen J., et aL, "Algorithm Description of Joint Exploration Test Model 1," Joint Video Exploration Team (JVET) of ITU-T SG16 WP3 and ISO/IEC JTC1/SC29/WG11 1nd Meeting: Geneva, CH, Oct. 19-21, 2015, JVET-A1001, 27 pp.
"Camera Aperture Image and Usage," SMPTE Standard for Motion-Picture Film (8-mm Type R), SMPTE-231-2004, Society of Motion Picture and Television Engineers, Nov. 8, 2004, 4 pp.
Chen J., et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.

"High Dynamic Range Electro-Optical Transfer Function of Mastering Reference Displays" SMPTE Standard, SMPTE-2084:2014; 14 pp.
Rusanovskyy et al., "Dynamic Range Adjustment SEI to enable High Dynamic Range video coding with Backward-Compatible Capability," COM16-C 1027-E, Sep. 2015, 11 pp.
ITU-R Recommendation BT.709-6, "Parameter values for the HDTV standards for production and international programme exchange," Jun. 2015, pp. 1-17.
ITU-R Recommendation BT.2020-2, "Parameter values for ultra-high definition television systems for production and international programme exchange," Oct. 2015, 8 pp.
Ramasubramonian A K. et al., "HDR CE2.a-1: Report on LCS," Joint Collaborative Team on Video Coding (JCT-VC) of ITU-T SG 16 WP 3 and ISO/IEC JTC 1/SC 29/WG 11, 23rd Meeting, San Diego, US, JCTVC-W0101r1, Feb. 19-26, 2016, 7 pp.
Chen J., et al., "JVET-G1001—Algorithm Description of Joint Exploration Test Model 7 (JEM7)," Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, IT, Aug. 19, 2017 (Aug. 19, 2017), 51 Pages, XP030150980, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18.
Bross B., et al., "Versatile Video Coding (Draft 1)," Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Bross B., "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, JVET-L1001-v9, 227 pp.
Chen J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11,12th Meeting: Macao, CN, Oct. 3-12, 2018, JVET-L1002-v1, 48 pp.
Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Bordes, et al., "Description of SDR, HDR and 360 Video Coding Technology Proposal by Qualcomm and Technicolor-Medium Complexity Version," JVET-J0022r1, 10th Meeting; San Diego, US, Apr. 10-20, 2018, (The Joint Video Exploration Team of ISO/IEC JTC1/SC29/WG11 and ITU-T SG.16); 84 pp.

\* cited by examiner

Example of EOTFs

QUANTIZATION PARAMETER CONTROL FOR VIDEO CODING WITH JOINED PIXEL/TRANSFORM BASED QUANTIZATION

This application claims the benefit of U.S. Provisional Application 62/607,887 filed 19 Dec. 2017, the entire content of which is herein incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

One or more aspects of this disclosure relate to the field of coding video signals, e.g., video data, with High Dynamic Range (HDR) and Wide Color Gamut (WCG) representations.

According to one example, a method of processing high dynamic range and/or wide color gamut (HDR/WCG) video data includes determining a quantization parameter for quantized transform coefficients of a block of the HDR/WCG video data; inverse quantizing the quantized transform coefficients based on the determined quantization parameter to determine dequantized transform coefficients; based on the dequantized transform coefficients, determining a block of residual values for the block of the HDR/WCG video data; based on the block of residual values, determining a reconstructed block for the block of the HDR/WCG video data; determining one or more dynamic range adjustment (DRA) parameters for the block of the HDR/WCG video data; adjusting the one or more DRA parameters based on the determined quantization parameter to determine one or more adjusted DRA parameters; and performing DRA on the reconstructed block of the HDR/WCG video data using the one or more adjusted DRA parameters.

According to another example, a device for processing high dynamic range and/or wide color gamut (HDR/WCG) video data includes a memory configured to store video data and one or more processors coupled to the memory and configured to determine a quantization parameter for quantized transform coefficients of a block of the HDR/WCG video data; inverse quantize the quantized transform coefficients based on the determined quantization parameter to determine dequantized transform coefficients; based on the dequantized transform coefficients, determine a block of residual values for the block of the HDR/WCG video data; based on the block of residual values, determine a reconstructed block for the block of the HDR/WCG video data; determine one or more dynamic range adjustment (DRA) parameters for the block of the HDR/WCG video data; adjust the one or more DRA parameters based on the determined quantization parameter to determine one or more adjusted DRA parameters; and perform DRA on the reconstructed block of the HDR/WCG video data using the one or more adjusted DRA parameters.

According to another example, a computer readable medium stores instructions that when executed by one or more processors cause the one or more processors to determine a quantization parameter for quantized transform coefficients of a block of high dynamic range and/or wide color gamut (HDR/WCG) video data; inverse quantize the quantized transform coefficients based on the determined quantization parameter to determine dequantized transform coefficients; based on the dequantized transform coefficients, determine a block of residual values for the block of the HDR/WCG video data; based on the block of residual values, determine a reconstructed block for the block of the HDR/WCG video data; determine one or more dynamic range adjustment (DRA) parameters for the block of the HDR/WCG video data; adjust the one or more DRA parameters based on the determined quantization parameter to determine one or more adjusted DRA parameters; and perform DRA on the reconstructed block of the HDR/WCG video data using the one or more adjusted DRA parameters.

According to another example, an apparatus for processing high dynamic range and/or wide color gamut (HDR/WCG) video data includes means for determining a quantization parameter for quantized transform coefficients of a block of the HDR/WCG video data; means for inverse quantizing the quantized transform coefficients based on the determined quantization parameter to determine dequantized transform coefficients; means for determining a block of residual values for the block of the HDR/WCG video data based on the dequantized transform coefficients; means for determining a reconstructed block for the block of the HDR/WCG video data based on the block of residual values; means for determining one or more dynamic range adjustment (DRA) parameters for the block of the HDR/WCG video data; means for adjusting the one or more DRA parameters based on the determined quantization parameter to determine one or more adjusted DRA parameters; and means for performing DRA on the reconstructed block of the HDR/WCG video data using the one or more adjusted DRA parameters.

The details of one or more examples of the disclosure are set forth in the accompanying drawings and the description below. Other features, objects, and advantages will be apparent from the description, drawings, and claims.

DETAILED DESCRIPTION

This disclosure describes techniques related to the field of coding video signals with High Dynamic Range (HDR) and Wide Color Gamut (WCG) representations. More specifically, this disclosure describes signaling and operations applied to video data in certain color spaces to enable more efficient compression of HDR and WCG video data. The techniques of this disclosure may improve the compression efficiency of hybrid-based video coding systems utilized for coding HDR & WCG video data.

As will be explained in more detail below, HDR video generally refers to video that has a dynamic range that is greater than that of standard dynamic range (SDR) video. WCG generally refers to video that is represented with a wider color gamut that may include more vivid color, such as redder reds, greener greens, bluer blues, etc. Both HDR and WCG can make video appear more realistic. While making video appear more realistic, HDR and WCG also can increase the complexity associated with encoding and decoding video data. The techniques of this disclosure may help reduce the complexity associated with encoding and decoding HDR and WCG video data and, more specifically, may reduce the complexity associated with encoding and decoding HDR and WCG video data by harmonizing the quantization performed in the transform domain when quantizing transform coefficients and the scaling and quantization performed in the pixel domain when performing dynamic range adjustment (DRA).

Figure 1:
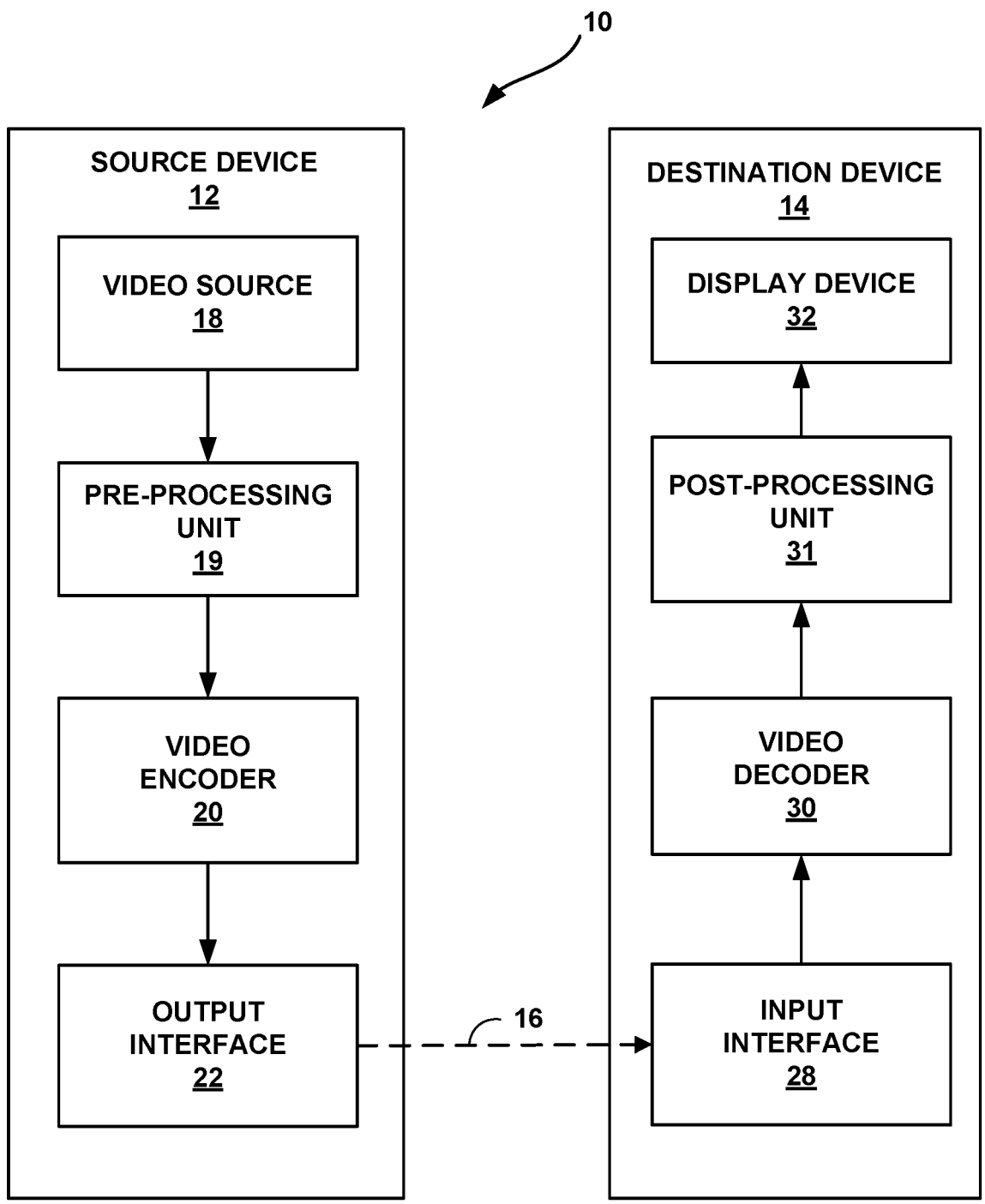
FIG. 1 is a block diagram illustrating an example video encoding and decoding system that may utilize the techniques described in this disclosure.

FIG. 1 is a block diagram illustrating an example video encoding and decoding system 10 that may process HDR/WCG video data and utilize the DRA techniques described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wired or wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, pre-processing unit 19, video decoder 30, and display device 32. In accordance with this disclosure, pre-processing unit 19 of source device 12 may be configured to implement the techniques of this disclosure, including signaling and related operations applied to video data in certain color spaces to enable more efficient compression of HDR and WCG video data. In some examples, pre-processing unit 19 may be separate from video encoder 20. In other examples, pre-processing unit 19 may be part of video encoder 20. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing and coding HDR and WCG video data may be performed by any digital video encoding and/or video decoding device. Moreover, the techniques of this disclosure may also be performed by a video preprocessor and/or video postprocessor. A video preprocessor may be any device configured to process video data before encoding (e.g., before HEVC or other encoding). A video postprocessor may be any device configured to process video data after decoding (e.g., after HEVC or other decoding). Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components, as well as a video preprocessor and a video postprocessor (e.g., pre-processing unit and post-processing unit 31, respectively). Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Pre-processing unit 19 and post-processing unit 31 each may be implemented as any of a variety of suitable encoder circuitry, such as one or more microprocessors, DSPs, ASICs, FPGAs, discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Video encoder 20 and video decoder 30 may operate according to a video compression standard, such as the recently finalized High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate proposed compression technology designs. The JVET first met during 19-21 Oct. 2015 and developed several different versions of reference software, referred to as Joint Exploration Models (JEM). One example of such reference software is referred to as JEM 7 and is described in J. Chen, E. Alshina, G. J. Sullivan, J.-R. Ohm, J. Boyce, "Algorithm Description of Joint Exploration Test Model 7," JVET-G1001, 13-21 Jul. 2017.

Based on the work of ITU-T VCEG (Q6/16) and ISO/IEC MPEG (JTC 1/SC 29/WG 11), a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)." Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)."

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

In HEVC and other video example coding standards, a video sequence may include a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In JEM7, rather than using the quadtree partitioning structure of HEVC described above, a quadtree binary tree (QTBT) partitioning structure may be used. The QTBT structure removes the concepts of multiple partitions types. That is, the QTBT structure removes the separation of the CU, PU, and TU concepts, and supports more flexibility for CU partition shapes. In the QTBT block structure, a CU can have either a square or rectangular shape. In one example, a CU is first partition by a quadtree structure. The quadtree leaf nodes are further partitioned by a binary tree structure.

In some examples, there are two splitting types: symmetric horizontal splitting and symmetric vertical splitting. The binary tree leaf nodes are called CUs, and that segmentation (i.e., the CU) is used for prediction and transform processing without any further partitioning. This means that the CU, PU, and TU have the same block size in the QTBT coding block structure. In JEM, a CU sometimes consists of coding blocks (CBs) of different color components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR and WCG. Parameters of the utilized dynamic range and color gamut are two independent attributes of video content, and their specification for purposes of digital television and multimedia services are defined by several international standards. For example, ITU-R Rec. 709 defines parameters for HDTV such as Standard Dynamic Range and standard color gamut and ITU-R Rec.2020 specifies UHDTV parameters such as High Dynamic Range, and wide color gamut. There are also other SDOs documents specifying these attributes in other systems, e.g. P3 color gamut is defined in SMPTE-231-2 and some parameters of HDR are defined STMPTE-2084. A brief description of dynamic range and color gamut for video data is provided below.

Video encoder 20 and video decoder 30, in conjunction with other components such as pre-processing unit 19 and post-processing unit 31, respectively, may implement dynamic range coding. Dynamic range is typically defined as the ratio between the minimum and maximum brightness of the video signal. Dynamic range is also measured in terms of 'f-stop', where one f-stop corresponds to a doubling of the signal dynamic range. In MPEG's definition, the High Dynamic Range content is such content that features brightness variation with more than 16 f-stops. In some terms, levels between 10 and 16 f-stops are considered as intermediate dynamic range but may also be considered as HDR in other definitions. At the same time, the human visual system is capable of perceiving much larger dynamic range and includes an adaptation mechanism to narrow the so called simultaneous range.

Current video application and services are regulated by Rec.709 and provide SDR, typically supporting a range of brightness (or luminance) of around 0.1 to 100 candelas (cd) per m2 (often referred to as "nits"), leading to less than 10 f-stops. The next generation video services are expected to provide dynamic range of up-to 16 f-stops and although detailed specification is currently under development, some initial parameters of have been specified in SMPTE-2084 and Rec.2020.

Figure 2:
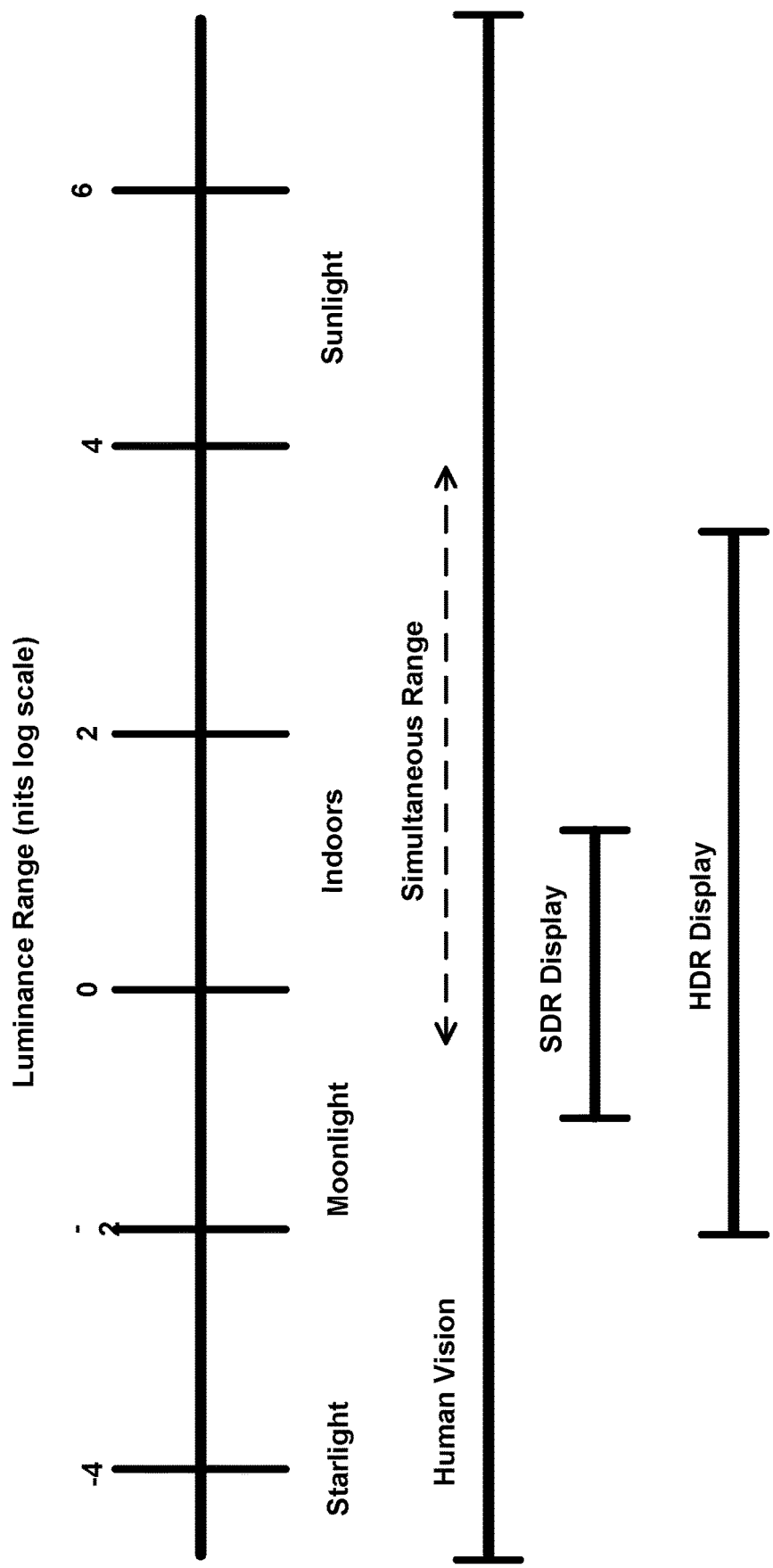
FIG. 2 is a conceptual drawing illustrating the concepts of HDR data.

FIG. 2 shows an example of human vision and display capabilities. Visualization of dynamic range provided by SDR of HDTV, expected HDR of UHDTV and HVS dynamic range is shown in FIG. 2.

Figure 3:
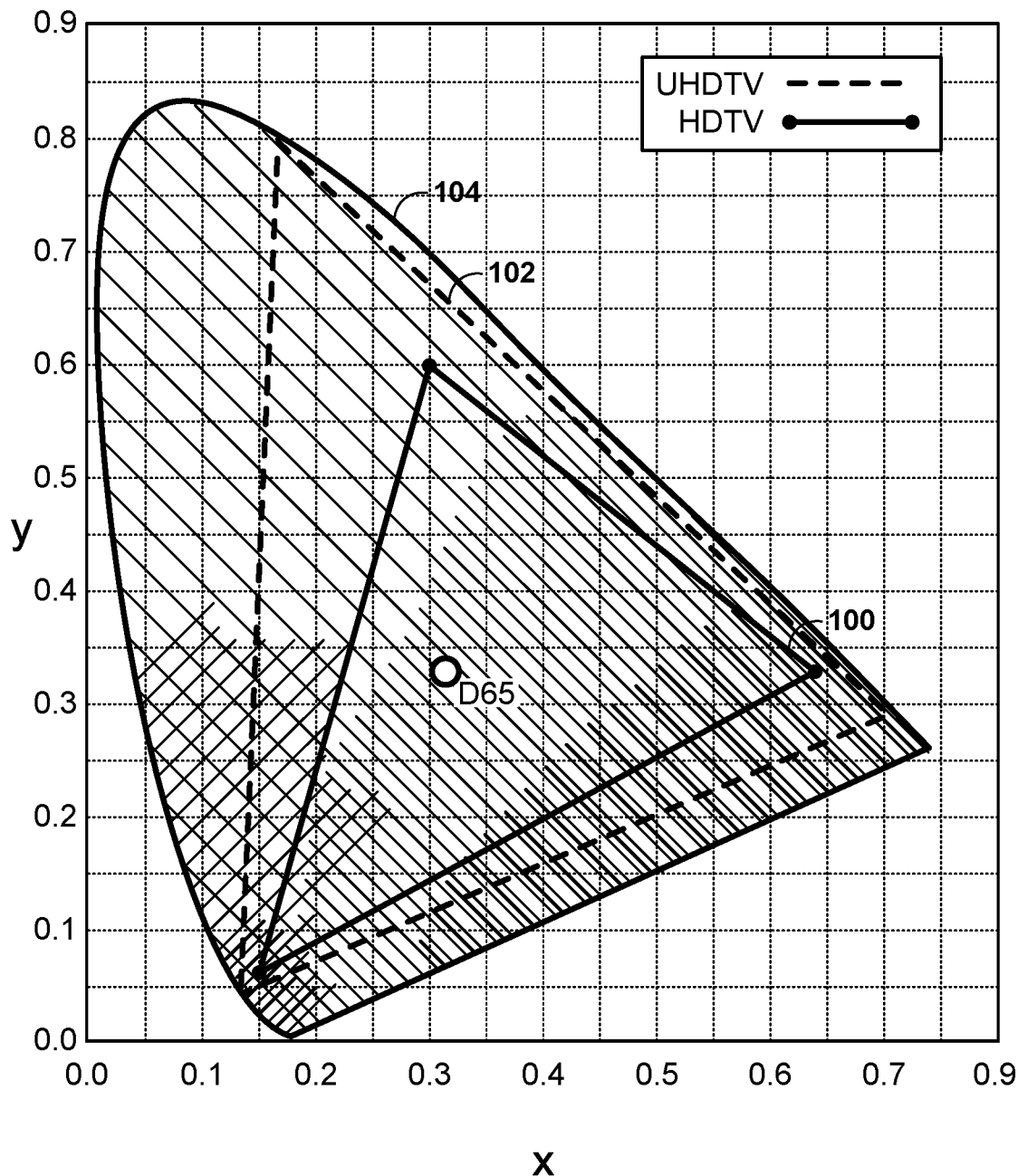
FIG. 3 is a conceptual diagram illustrating example color gamuts.

FIG. 3 shows an example of color gamuts. Another aspect for a more realistic video experience besides HDR is the color dimension, which is conventionally defined by the color gamut. FIG. 3 shows the SDR color gamut (triangle 100 based on the BT.709 color red, green and blue color primaries), and the wider color gamut that for UHDTV (triangle 102 based on the BT.2020 color red, green and blue color primaries). FIG. 3 also depicts the so-called spectrum locus (shape 104), representing limits of the natural colors. As illustrated by FIG. 3, moving from BT.709 to BT.2020 color primaries aims to provide UHDTV services with about 70% more colors. D65 specifies the white color for given specifications.

Examples of color gamut specification are shown in Table 1.

TABLE 1

Colorimetry parameters for selected color spaces
RGB color space parameters

| Color space | White point | | Primary colors | | | | | |
|---|---|---|---|---|---|---|---|---|
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

Video encoder 20 and video decoder 30 may perform compression of HDR video data. HDR/WCG is typically acquired and stored at a very high precision per component (even floating point), with the 4:4:4 chroma format and a very wide color space (e.g., XYZ). This representation targets high precision and is (almost) mathematically lossless. However, this format feature a lot of redundancies and is not optimal for compression purposes. A lower precision format with HVS-based assumption is typically utilized for state-of-the-art video applications.

Figure 4:
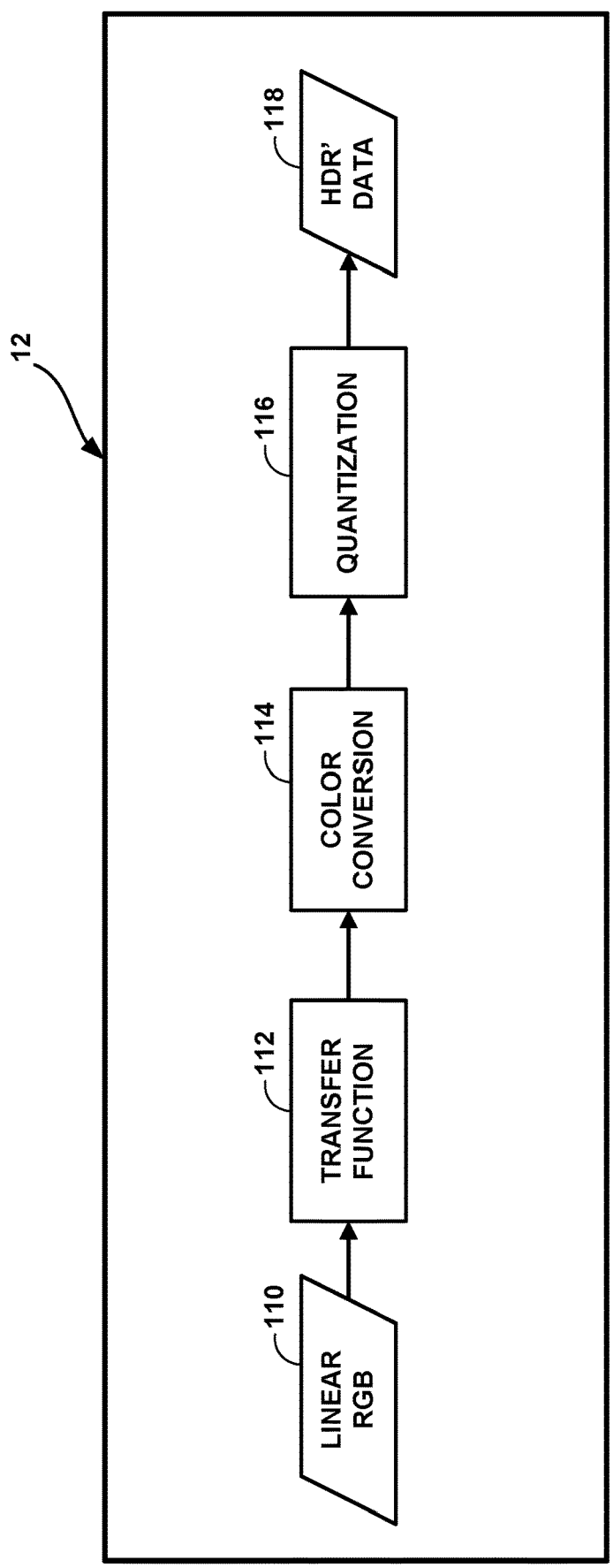
FIG. 4 is a flow diagram illustrating an example of HDR/WCG representation conversion.

Typical HDR video data format conversion for purposes of compression consists of three major elements, as shown in FIG. 4—(1) non-linear transfer function (TF) for dynamic range compacting, (2) color Conversion to a more compact or robust color space, and (3) floating-to-integer representation conversion (Quantization).

One example of a video data format conversion process for purposes of compression includes three major processes, as shown in FIG. 4. The techniques of FIG. 4 may be performed by source device 12. Linear RGB data 110 may be HDR/WCG video data and may be stored in a floating-point representation. Linear RGB data 110 may be compacted using a non-linear transfer function (TF) 112 for dynamic range compacting. Transfer function 112 may compact linear RGB data 110 using any number of non-linear transfer functions, e.g., the PQ TF as defined in SMPTE-2084. In some examples, color conversion process 114 converts the compacted data into a more compact or robust color space (e.g., a YUV or YCrCb color space) that is more suitable for compression by a hybrid video encoder. This data is then quantized using a floating-to-integer representation quantization unit 116 to produce converted HDR' data 118. In this example HDR' data 118 is in an integer representation. The HDR' data is now in a format more suitable for compression by a hybrid video encoder (e.g., video encoder 20 applying HEVC techniques). The order of the processes depicted in FIG. 4 is given as an example and may vary in other applications. For example, color conversion may precede the TF process. In addition, additional processing, e.g. spatial subsampling, may be applied to color components.

Figure 5:
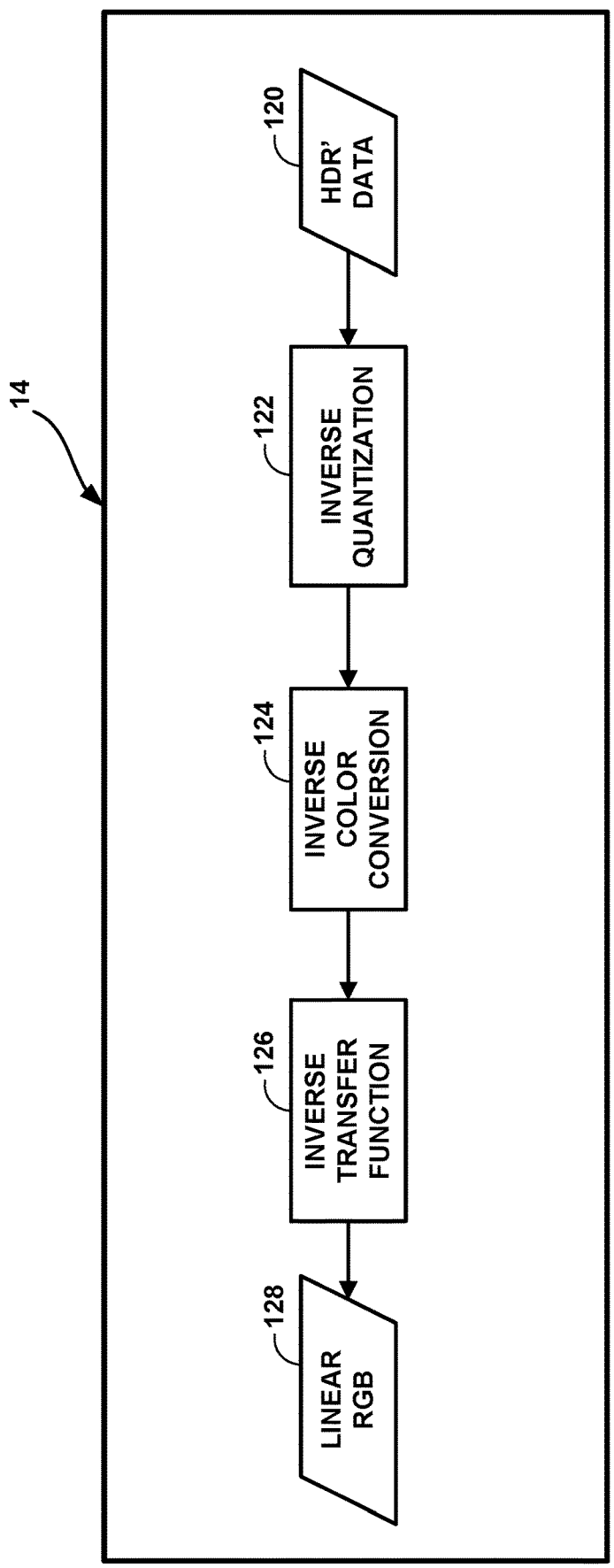
FIG. 5 is a flow diagram illustrating an example of HDR/WCG inverse conversion.

The inverse conversion at the decoder (e.g., video decoder 30) is depicted in FIG. 5. The techniques of FIG. 5 may be performed by video decoder 30 and/or post-processing unit 31 at destination device 14. Converted HDR' data 120 may be obtained at destination device 14 through decoding video data using a hybrid video decoder (e.g., video decoder 30 applying HEVC techniques). HDR' data 120 may then be inverse quantized by inverse quantization unit 122. Then an inverse color conversion process 124 may be applied to the inverse quantized HDR' data. The inverse color conversion process 124 may be the inverse of color conversion process 114. For example, the inverse color conversion process 124 may convert the HDR' data from a YCrCb format back to an RGB format. Next, inverse transfer function 126 may be applied to the data to add back the dynamic range that was compacted by transfer function 112 to recreate the linear RGB data 128.

The high dynamic range of input RGB data in linear and floating point representation is compacted with the utilized non-linear transfer function TF, e.g., PQ TF as defined in SMPTE-2084, following which it is converted to a target color space more suitable for compression, e.g. YCbCr, and then quantized to achieve integer representation. The order of these elements is given as an example, and may vary in real-world applications, e.g. color conversion may precede the TF module, as well as additional processing, e.g. spatial subsampling may be applied to color components. These three components are described in more detail.

Figure 6:
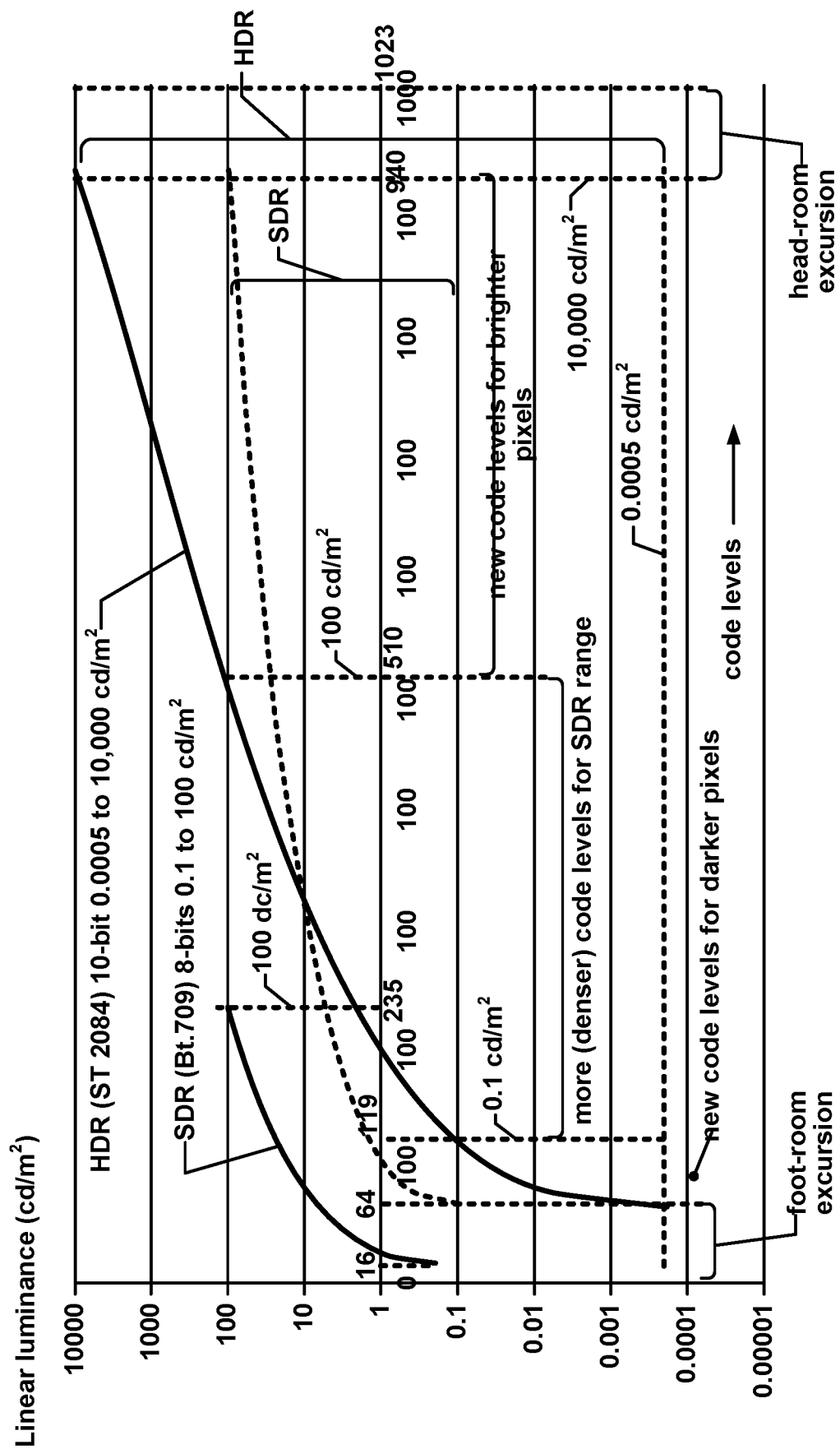
FIG. 6 is conceptual diagram illustrating example of Electro-optical transfer functions (EOTF) utilized for video data conversion (including SDR and HDR) from perceptually uniform code levels to linear luminance

Video encoder 20 and video decoder 30 may utilize transfer functions (TFs). A TF is applied to the data to compact the dynamic range of the data and make it possible to represent the data with limited number of bits. This function is typically a one-dimensional (1D) non-linear function either reflecting inverse of electro-optical transfer function (EOTF) of the end-user display as specified for SDR in Rec.709 or approximating the HVS perception to brightness changes as for PQ TF specified in SMPTE-2084 for HDR. The inverse process of the OETF is the EOTF (electro-optical transfer function), which maps the code levels back to luminance. FIG. 6 shows several examples of TFs.

Specification of ST2084 defined the EOTF application as following. TF is applied to a normalized linear R, G, B values which results in nonlinear representation of R'G'B'. ST2084 defines normalization by NORM=10000, which is associated with a peak brightness of 10000 nits (cd/m2).

$$R' = PQ\_TF(\max(0, \min(R/NORM, 1))) \quad (1)$$
$$G' = PQ\_TF(\max(0, \min(G/NORM, 1)))$$
$$B' = PQ\_TF(\max(0, \min(B/NORM, 1)))$$

with $$PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Figure 7:
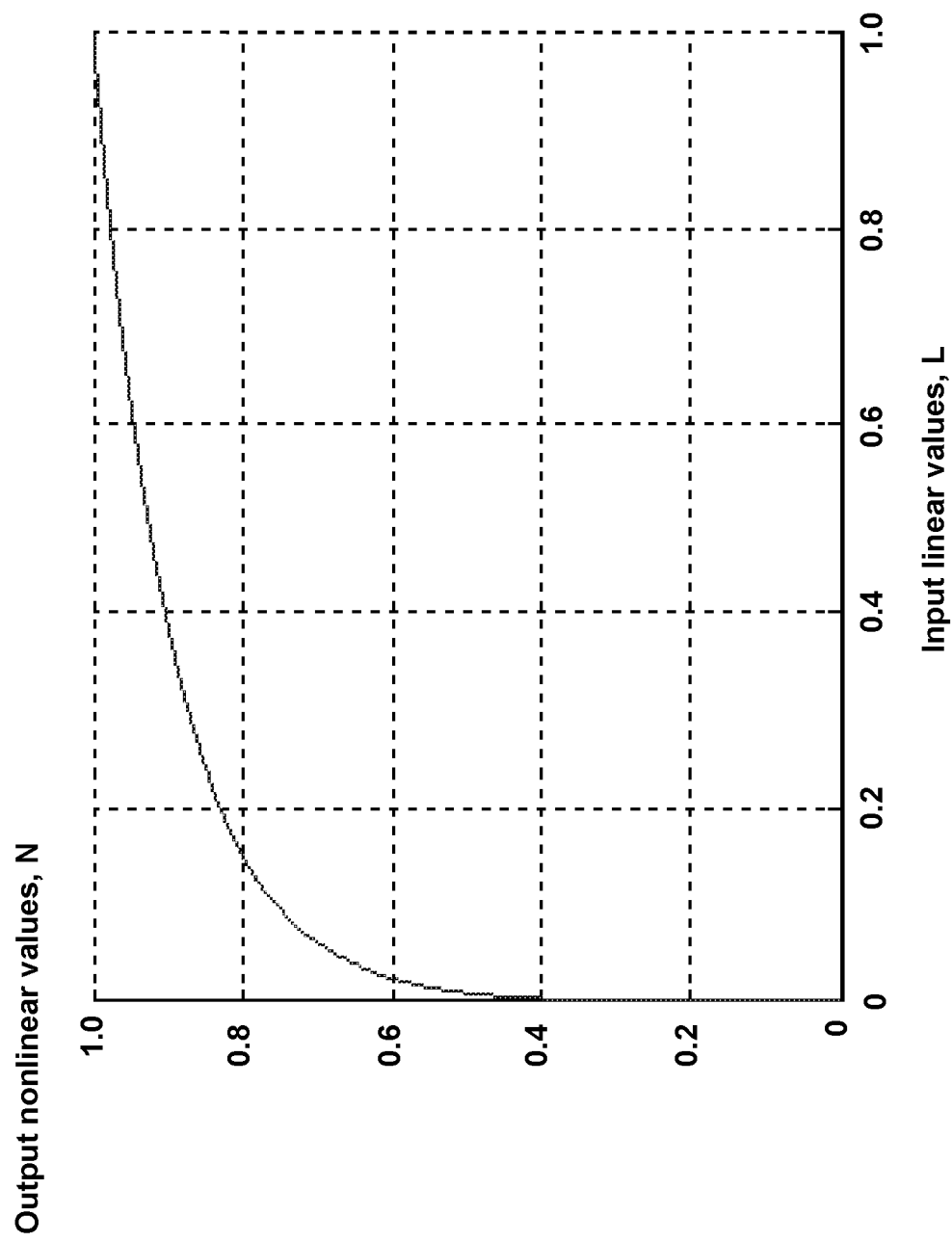
FIG. 7 shows an example Visualization of PQ TF (ST2084 EOTF).

FIG. 7 shows an example Visualization of PQ TF (ST2084 EOTF). With input values (linear color value) normalized to range 0 . . . 1 and normalized output values (nonlinear color value) PQ EOTF is visualized in FIG. 7. As can be seen from the curve, 1 percent (low illumination) of dynamical range of the input signal is converted to 50% of dynamical range of output signal.

Typically, EOTF is defined as a function with a floating point accuracy, thus no error is introduced to a signal with this non-linearity if inverse TF so called OETF is applied. Inverse TF (OETF) specified in ST2084 is defined as inversePQ function:

$$R = 10000 * inversePQ\_TF(R') \quad (2)$$
$$G = 10000 * inversePQ\_TF(G')$$
$$B = 10000 * inversePQ\_TF(B')$$

with $inversePQ\_TF(N) = \left(\frac{\max[(N^{1/m_2} - c_1), 0]}{c_2 - c_3 N^{1/m_2}}\right)^{1/m_1}$ $$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

With floating point accuracy, sequential application of EOTF and OETF provides a perfect reconstruction without errors. However, this representation is not optimal for streaming or broadcasting services. More compact representation with fixed bits accuracy of nonlinear R'G'B' data is described in following sections. Note, that EOTF and OETF is a subject of very active research currently, and TF utilized in some HDR video coding systems may be different from ST2084.

Video encoder 20 and video decoder 30 may be configured to implement color transforms. RGB data is typically utilized as an input, because RGB data is produced by image capturing sensors. However, this color space has high redundancy among components and is not optimal for compact representation. To achieve more compact and more robust representation, RGB components are typically converted to a more uncorrelated color space more suitable for compression, e.g. YCbCr. This color space separates the brightness in the form of luminance and color information in different un-correlated components.

For modern video coding systems, typically used colour space is YCbCr, as specified in ITU-R BT.709 or ITU-R BT.709. The YCbCr colour space in BT.709 standard specifies the following conversion process from R'G'B' to Y'CbCr (non-constant luminance representation):

$$Y' = 0.2126*R' + 0.7152*G' + 0.0722*B' \quad (3)$$
$$Cb = \frac{B' - Y'}{1.8556}$$
$$Cr = \frac{R' - Y'}{1.5748}$$

The above can also be implemented using the following approximate conversion that avoids the division for the Cb and Cr components:

$$Y'=0.212600*R'+0.715200*G'+0.072200*B'$$
$$Cb=-0.114572*R'-0.385428*G'+0.500000*B'$$
$$Cr=0.500000*R'-0.454153*G'-0.045847*B' \quad (4)$$

The ITU-R BT.2020 standard specifies the following conversion process from R'G'B' to Y'CbCr (non-constant luminance representation):

$$Y' = 0.2627*R' + 0.6780*G' + 0.0593*B' \quad (5)$$
$$Cb = \frac{B' - Y'}{1.8814}$$
$$Cr = \frac{R' - Y'}{1.4746}$$

The above can also be implemented using the following approximate conversion that avoids the division for the Cb and Cr components:

$$Y'=0.262700*R'+0.678000*G'+0.059300*B'$$
$$Cb=-0.139630*R'-0.360370*G'+0.500000*B'$$
$$Cr=0.500000*R'-0.459786*G'-0.040214*B' \quad (6)$$

It should be noted, that both color spaces remain normalized, therefor, for the input values normalized in the range 0 . . . 1 the resulting values will be mapped to the range 0 . . . 1. Generally, color transforms implemented with floating point accuracy provide perfect reconstruction, thus this process is losels.

Video encoder 20 and video decoder 30 may implement quantization/fixed point conversion. The processing stages described above are typically implemented in floating point accuracy representation, and thus can be considered as lossless. However, this type of accuracy can be considered as redundant and expensive for most of consumer electronics applications. For such applications, input data in a target color space is typically converted to a target bit-depth fixed point accuracy. Certain studies show that 10-12 bits accuracy in combination with the PQ TF is sufficient to provide HDR data of 16 f-stops with distortion below the Just-Noticeable Difference. Data represented with 10 bits accuracy can be further coded with most of the state-of-the-art video coding solutions. This conversion process includes signal quantization and is an element of lossy coding and is a source of inaccuracy introduced to converted data.

An example of such quantization applied to code words in a target color space, YCbCr in this example, is shown below. Input values YCbCr represented in floating point accuracy are converted into a signal of fixed bit-depth BitDepthY for the Y value and BitDepthC for the chroma values (Cb, Cr).

$$D_Y=\text{Clip1}_Y(\text{Round}((1<<(\text{BitDepth}_Y-8))*(219*Y'+16)))$$

$$D_{Cb}=\text{Clip1}_C(\text{Round}((1<<(\text{BitDepth}_C-8))*(224*Cb+128)))$$

$$D_{Cr}=\text{Clip1}_C(\text{Round}((1<<(\text{BitDepth}_C-8))*(224*Cr+128))) \quad (7)$$

with
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
Clip1$_Y$(x)=Clip3(0, (1<<BitDepth$_Y$)−1, x)
Clip1$_C$(x)=Clip3(0, (1<<BitDepth$_C$)−1, x)
Clip3(x,y,z)=x if z<x, y if z>y, z otherwise Video encoder 20 and video decoder 30 may implement DRA. DRA was initially proposed in Dynamic Range Adjustment SEI to enable High Dynamic Range video coding with Backward-Compatible Capability, D. Rusanovskyy, A. K. Ramasubramonian, D. Bugdayci, S. Lee, J. Sole, M. Karczewicz, VCEG document COM16-C 1027-E, September 2015 (hereinafter Reference 1). The authors proposed to implement DRA as a piece-wise linear function f(x) that is defined for a group of non-overlapped dynamic range partitions (ranges) {Ri} of input value x, were i is an index of the range with range of 0 to N−1, inclusive, and where N is the total number of ranges {Ri} utilized for defining DRA function. Let's assume that ranges of the DRA are defined by minimum and a maximum x value that belong to the range Ri, e.g. [$x_i$, $x_{i+1}$−1] where $x_i$ and $x_{i+1}$ denote minimum value of the ranges $R_i$ and $R_{i+1}$ respectively. Applied to Y color component of the video (luma), DRA function Sy is defined through a scale $S_{y,i}$ and offset $O_{y,i}$ which are applied to every x∈[$x_i$, $x_{i+1}$−1], thus $S_y=\{S_{y,i},O_{y,i}\}$.

With this, for any Ri, and every x∈[$x_i$, $x_{i+1}$−1], the output value X is calculated as follows:

$$X=S_{y,i}*(x-O_{y,i}) \quad (8)$$

For the inverse DRA mapping process for luma component Y conducted at the decoder, DRA function Sy is defined by inverse of scale $S_{y,i}$ and offset $O_{y,i}$ values which are applied to every X∈[$X_i$, $X_{i+1}$−1].

With this, for any Ri, and every X∈[$X_i$, $X_{i+1}$−1], reconstructed value x is calculated as follows:

$$X=X/S_{y,i}+O_{y,i} \quad (9)$$

The forward DRA mapping process for chroma components Cb and Cr were defined as following. Example is given with the term "u" denoting sample of Cb color component that belongs to range Ri, u∈[$u_i$, $u_{i+1}$−1], thus $S_u$={$S_{u,i}$,$O_{u,i}$}.

$$U=S_{u,i}*(u-O_{y,i})+\text{Offset} \quad (10)$$

where Offset is equal to $2^{(bitdepth-1)}$ denotes the bi-polar Cb, Cr signal offset.

The inverse DRA mapping process conducted at the decoder for chroma components Cb and Cr were defined as follows. Example is given with the U term denoting sample of remapped Cb color component which belongs to the range Ri, U∈[$U_i$,$U_{i+i}$−1]:

$$u=(U-\text{Offset})/S_{u,i}+O_{y,i} \quad (11)$$

where Offset is equal to $2^{(bitdepth-1)}$ denotes the bi-polar Cb, Cr signal offset.

Video encoder 20 and video decoder 30 may also implement luma-driven chroma scaling (LCS). LCS was initially proposed in JCTVC-W0101 HDR CE2: Report on CE2.a-1 LCS, A. K. Ramasubramonian, J. Sole, D. Rusanovskyy, D. Bugdayci, M. Karczewicz (hereinafter Reference 2). In Reference 2, techniques to adjust chroma information, e.g., Cb and Cr, by exploiting brightness information associated with the processed chroma sample was proposed. Similarly to the DRA approach of Reference 1, it was proposed to apply to a chroma sample a scale factor $S_u$ for Cb and $S_{v,i}$ for Cr. However, instead of defining DRA function as piecewise linear function $S_u$={$S_{u,i}$,$O_{u,i}$} for a set of ranges {$R_i$} accessible by chroma value u or v as in Equations (3) and (4), the LCS approach proposed to utilize luma value Y to derive a scale factor for chroma sample. With this, forward LCS mapping of the chroma sample u (or v) is conducted as:

$$U=S_{u,i}(Y)*(u-\text{Offset})+\text{Offset} \quad (12)$$

The inverse LCS process conducted at the decoder side is defined as following:

$$u=(U-\text{Offset})/S_{u,i}(Y)+\text{Offset} \quad (13)$$

In more details, for a given pixel located at (x, y), chroma samples Cb(x, y) or Cr(x, y) are scaled with a factor derived from an LCS function $S_{Cb}$ (or $S_{Cr}$) determine by corresponding luma value Y'(x, y).

At the forward LCS for chroma samples, Cb (or Cr) values and the associated luma value Y' are taken as an input to the chroma scale function $S_{Cb}$ (or $S_{Cr}$) and Cb or Cr are converted into Cb' and Cr' as shown in Equation 9. At the decoder side, the inverse LCS is applied, reconstructed Cb' or Cr' are converted to Cb, or Cr as it shown in Equation (10).

$$Cb'(x, y) = S_{Cb}(Y'(x, y)) * Cb(x, y),$$
$$Cr'(x, y) = S_{Cr}(Y'(x, y)) * Cr(x, y) \quad (14)$$

$$Cb(x, y) = \frac{Cb'(x, y)}{S_{Cb}(Y'(x, y))}$$
$$Cr(x, y) = \frac{Cr'(x, y)}{S_{Cr}(Y'(x, y))} \quad (15)$$

Figure 8:
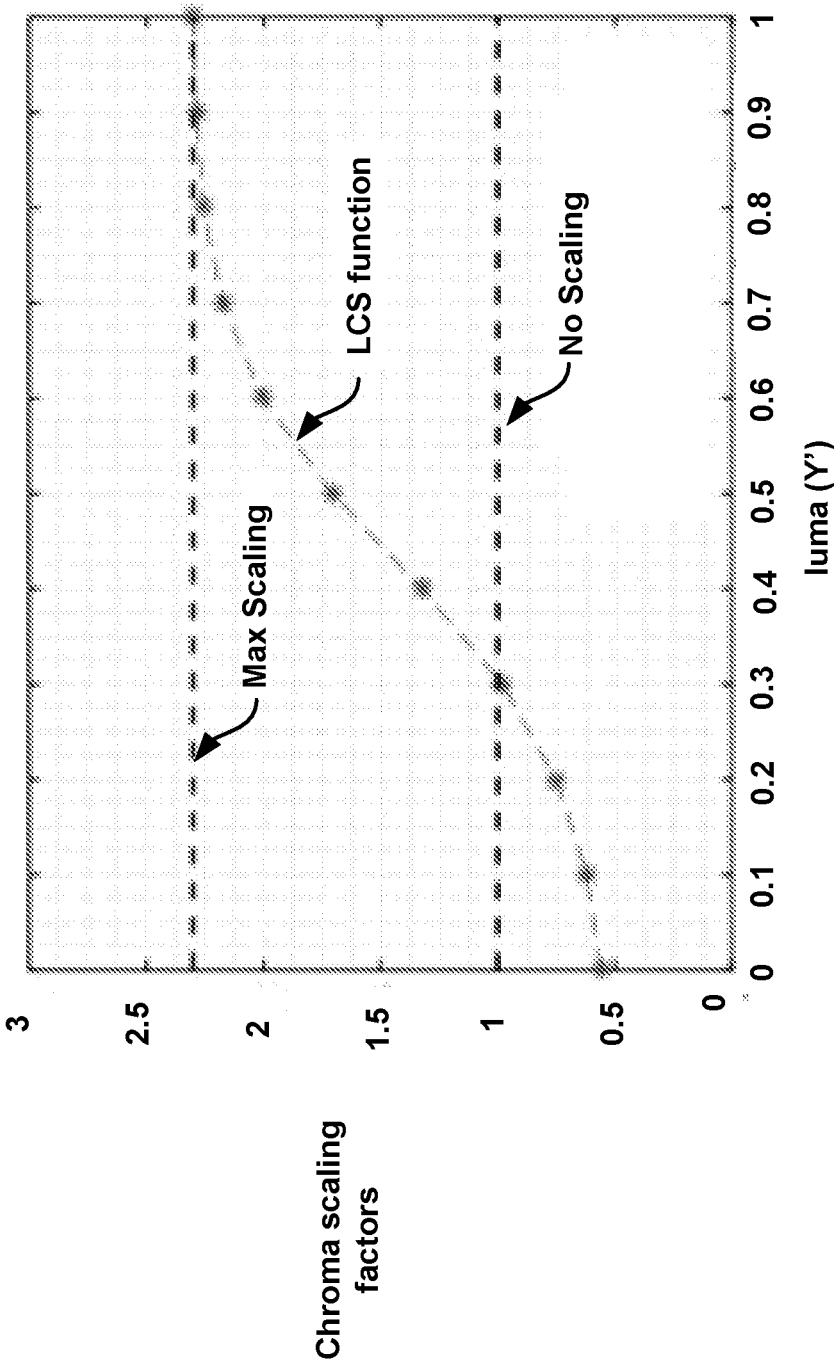
FIG. 8 shows an example of an LCS function.

FIG. 8 shows an example of LCS functions, with the LCS function in the example, chroma components of pixels with smaller values of luma are multiplied with smaller scaling factors.

The relationship between DRA sample scaling and quantization parameters will now be discussed. To adjust compression ratio, video encoder 20 utilizes block transform based video coding schemes, such as HEVC, utilizing scalar quantizers which are applied to transform coefficients. Video encoder 20 can control a scalar quantizer based on a quantization parameter (QP), with the relationship between QP and scalar quantizer defined as following:

$$\text{scaler}=\exp(QP/6)*\log(2.0)) \quad (16)$$

The inverse function defines the relationship between a scalar quantizer and QP in HEVC, as follows:

$$QP=\log 2(\text{scaler})*6; \quad (17)$$

When implementing DRA, video encoder 20 and video decoder 30 effectively scale the pixel data and take into consideration transform properties, which can be mapped for a large class of signals to the scaler applied in the transform domain. Thus, following relationship is defined:

$$dQP=\log 2(\text{scaleDRA})*6; \quad (18)$$

where dQP is an approximate QP offset introduced, by HEVC for example, by deploying DRA on the input data.

Some of the non-linearities (e.g. applying transfer function SMPTE 2084) and colour representations (e.g. ITU-R BT.2020 or BT.22100) utilized in modern video coding systems may result in video data representations that feature significant variation of perceived distortion, or Just-Noticeable Difference (JND) threshold, over the dynamic range and color components of the signal representation. This can be perceived as unequal signal-to-noise ratios within the processed data range. To address this problem and linearize coding (quantization) error distributions in the dynamic range of the signal, the DRA method of Reference 1 was proposed.

Figure 9:
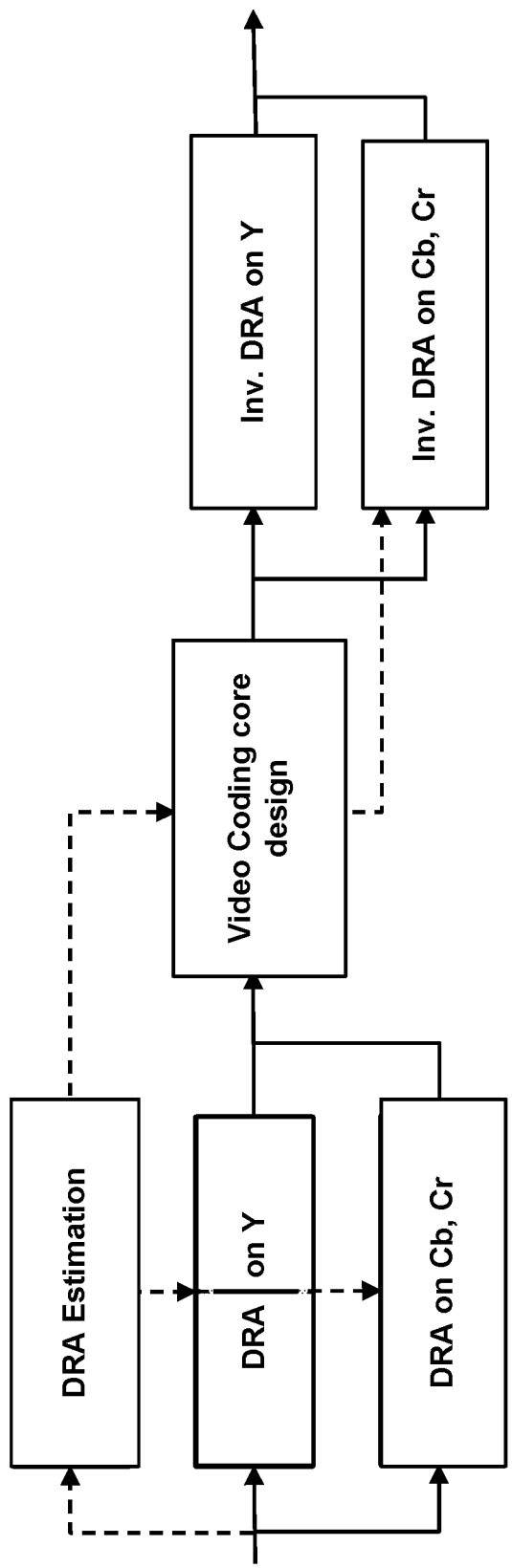
FIG. 9 shows an example of video coding system with DRA.

Reference 1 proposed to apply DRA to achieve a codewords re-distribution in video data in ST 2084/BT.2020 container prior to applying hybrid, transform-based video coding scheme H.265/HEVC, as shown in FIG. 9.

Redistribution achieved by DRA targets linearization of perceived distortion (signal to noise ratio) within a dynamical range. To compensate this redistribution at the decoder side and convert data to the original ST 2084/BT.2020 representation, an inverse DRA process is applied to the data after video decoding.

Another example of such DRA scheme was proposed in Luma-driven chroma scaling (LCS) design in HDR in JCTVC-W0101 HDR CE2: Report on CE2.a-1 LCS, A. K. Ramasubramonian, J. Sole, D. Rusanovskyy, D. Bugdayci, M. Karczewicz (hereinafter Reference 2).

Reference 2 proposed techniques to adjust chroma information, e.g., Cb and Cr, by exploiting brightness information associated with the processed chroma sample. Similarly, to the DRA approach in Reference 1, it was proposed to apply to a chroma sample a scale factor $S_u$ for Cb and $S_{v,i}$ for Cr. However, instead of defining DRA function as piecewise linear function $S_u$={$S_{u,i}$,$O_{u,i}$} for a set of ranges {$R_i$} accessible by chroma value u or v as in Equations (3) and (4), the LCS approach proposed to utilize luma value Y to derive a scale factor for chroma sample.

The DRA techniques applied to video signal represented with a finite number of bits per sample, e.g., 10 bits, can be classified as pixel level quantization. Being combined with video coding which deploys block-based scalar quantization in the transform domain (e.g. H.265/HEVC) produces a video coding system with joined quantization of the signal in pixel and transform domains.

Designs of some video coding schemes may incorporate video coding tools, normative decision-making logic and parameters which are based on assumption/estimation of quantization error being introduced to the coded signal.

Among examples of such tools, H.265/HEVC deblocking filter (e.g., HEVC clause 8.7.2) and QP derivation process (e.g. HEVC clause 8.6.1) at the decoder side can be listed.

Applying DRA at the pixel level may introduce quantization error that cannot be estimated correctly, which can cause decision logic utilized at the decoder to make non-optimal coding decisions. As an example, Table 8-10 of the HEVC specification defines the chroma QP shift utilized during QP derivation at both encoder and decoder, which may result in a QP index derived by Eq. 8-259/8-260 that does not reflect the pixel quantization/scaling applied to the samples of the current chroma block.

This disclosure describes techniques for quantization parameters control for video coding with joined pixel/transform based quantization. Example of such systems is a combination of conventional hybrid video coding utilizing quantization in transform domain and DRA performing scaling/quantization in the pixel domain either in the pre/post-processing stage, or inside of the encoding loop of video coding.

Video encoder 20 and video decoder 30 may perform DRA scales compensation for decoder QP handling. DRA scales for three color components are adjusted to compensated QP handing in video codec.

Let's assume that parameters of DRA for 3 color components (e.g. Y, Cb, Cr) are defined through following variables:

$$DRA_y = \{S_{y,i}, O_{y,i}\}$$

$$DRA_{Cb} = \{S_{Cb,i}, O_{Cb,i}\}$$

$$DRA_{Cr} = \{S_{Cr,i}, O_{Cr,i}\} \quad (19a)$$

DRA parameters conducting pixel processing are signaled through coded bitstream or derived at the decoder side from syntax elements signaled in the bitstream. These DRA parameters are further adjusted by taking into consideration information describing quantization of the transform coefficients.

$$DRA'_y = \text{fun}(DRA_y, QPx)$$

$$DRA'_{Cb} = \text{fun}(DRA_{Cb}, QPx)$$

$$DRA'_{Cr} = \text{fun}(DRA_{Cr}, QPx) \quad (19b)$$

QPx represents a QP adjustment or manipulation conducted by video encoder 20 for given block of pixels and signaled to video decoder 30 in the bitstream or provided to video decoder 30 as side information, e.g. as pre-tabulated information. The output of this process is adjusted DRA parameters ($DRA'_y$, $DRA'_{Cb}$, $DRA'_{Cr}$) which are to be applied on the decoded samples ($Y_{dec}$, $Cb_{dec}$, $Cr_{dec}$).

$$Yo = \text{fun}(DRA'_y, Y_{dec})$$

$$Cb_o = \text{fun}(DRA'_{Cb}, Cb_{dec})$$

$$Cr_o = \text{fun}(DRA'_{Cr}, Cr_{dec}) \quad (20)$$

Video encoder 20 and video decoder 30 may adjust QP information to reflect impact of DRA applied to pixels. QP information utilized in the decision making at the decoder side is altered to reflect impact of the DRA applied to pixels of the decoded picture.

$$QP'_y = \text{fun}(QPx, DRA_y)$$

$$QP'_{Cb} = \text{fun}(QPx, DRA_{Cb})$$

$$QP'_{Cr} = \text{fun}(QPx, DRA_{Cr}) \quad (21)$$

QPx are QP parameters derived by the decoder without taking into consideration scaling implemented by DRA processing to current processed pixels.

The output of this process are adjusted QP ($QP'_y$, $QP'_{Cb}$, $QP'_{Cr}$) which are utilized in decision making process at the decoder side. In some examples, only a subset of the methods in the decoding algorithm will use the adjusted QP in the decision making process.

Several non-limiting examples of implementation of the proposed techniques of this disclosure will be describe below.

DRA scales compensation for the chroma QP shift table will now be described. In some examples, derivation of the decoder's parameters may be based on local QP information derived from syntax elements of the decoded bitstream and further altered by a side information available at the decoder side.

An example of such processing is in the HEVC specification at clause 8.6.1:

The variables $qP_{Cb}$ and $qP_{Cr}$ are set equal to the value of Qpc as specified in Table 8-9 based on the index qPi equal to $qPi_{Cb}$ and $qPi_{Cr}$, respectively, and $qPi_{Cb}$ and $qPi_{Cr}$ are derived as follows:

$$qPi_{Cb} = \text{Clip3}(-QpBd\text{Offset}_C, 57, Qp_Y + pps\_cb\_qp\_\text{off-set} + slice\_cb\_qp\_\text{offset}) \quad (8\text{-}257)$$

$$qPi_{Cr} = \text{Clip3}(-QpBd\text{Offset}_C, 57, Qp_Y + pps\_cr\_qp\_\text{off-set} + slice\_cr\_qp\_\text{offset}) \quad (8\text{-}258)$$

If ChromaArrayType is equal to 1, the variables qPCb and qPCr are set equal to the value of QpC as specified in Table 8-10 based on the index qPi equal to qPiCb and qPiCr, respectively.

Otherwise, the variables qPCb and qPCr are set equal to Min(qPi, 51), based on the index qPi equal to qPiCb and qPiCr, respectively.

The chroma quantization parameters for the Cb and Cr components, $Qp'_{Cb}$ and $Qp'_{Cr}$, are derived as follows:

$$Qp'_{Cb} = qP_{Cb} + QpBd\text{Offset}_C \quad (8\text{-}259)$$

$$Qp'_{Cr} = qP_{Cr} + QpBd\text{Offset}_C \quad (8\text{-}260)$$

TABLE 8-9

Specification of $Qp_C$ as a function of qPi

| qPi | | | | | | | | | | | | | | | | |
|---|---|---|---|---|---|---|---|---|---|---|---|---|---|---|---|---|
| | <30 | 30 | 31 | 32 | 33 | 34 | 35 | 36 | 37 | 38 | 39 | 40 | 41 | 42 | 43 | >43 |
| $Qp_C$ | =qPi | 29 | 30 | 31 | 32 | 33 | 33 | 34 | 34 | 35 | 35 | 36 | 36 | 37 | 37 | =qPi − 6 |

In such an example, DRA scale parameters for chroma components can be altered to reflect QP shift introduced by such processing. Following example is given for Cb component, derivations for Cr components are similar.

Video decoder 30 may derive chroma quantization parameters for the Cb component with Table 8-10. The QP information is estimated:

estimateQP1=$qPcb$+QpBdPffset$C$ updatedQP1=fun(Table8-10,estimateQP1)

shiftQP1=updatedQP1−estimateQP1; (22)

Variable updatedQP1 is further used in the decoding process and shiftQP1 provides estimates for impact on the QP introduced by Table 8-10.

To harmonize pixel-level quantization conducted by DRA and QP handing in the decoder, DRA scaling function is altered as following:

estimateQP2=$qPcb$+QpBdPffset$C$+scale2QP (DRACb) (23)

where scale2QP(DRACb) conducts conversion from Scale to QP, similarly is shown in Eq. 18 updatedQP2=fun(Table8-10,estimateQP2)

shiftQP2=updatedQP2−estimateQP2; (24)

In some examples, in particularly in the case of cross-component DRA implementation (e.g. LCS), Eq. (23) will includes QP offset term estimated from DRA scale of the Y component and additional QP offset term estimated from chromaticity scale (addnDRACbScale) used to produce DRA for Cb component. E.g.

estimateQP2=$qPcb$+QpBdPffset$C$+scale2QP (DRAY)+scale2QP(addnDRACbScale)

Variable UpdatedQP2 provides an estimates for QP in the case if DRA would be conducted through transform domain scaling and shfitQP2 provides estimates of the impact on the QP introduced by Table8-10.

In some circumstances, estimated shiftQP1 would not be equal to shiftQP2. To compensate this difference, scales of DRA can be altered with an multiplicator as following:

shiftScale=$Qp$2Scale(shiftQP2−shiftQP1)

DRACb'=shiftScale*DRACb (25)

Where function Qp2Scale converts QP variable to associated quantizer scale as shown in Eq. 16.

The outputs of this process are an adjusted DRA scale which is applied to the decoded samples $Cb_{dec}$.

In some examples, the output of scale to QP conversion function scale2QP(DRACb) and the resulting estimateQP2 is a non-integer value. In order to address elements of the Table 8-10, input and output QP values to Table 8-10 may be interpolated between integer entries as following:

$qp$1=fun(Table8-10,(Int)estimateQP2;

$qp$2=fun(Table8-10,(Int)(estimateQP2+1.0));

shiftQP2=$qp$1+($qp$2−$qp$1)*(estimateQP2−(Int)estimateQP2); (26)

In yet other examples, entries of Table 8-10 (or similar tabulated information) can be defined through an analytical function, or explicitly signalled in the bitstream.

In yet another example, the shiftScale can be computed to compensate impact of Table8-10 shiftQP1 as follows:

shiftScale=$Qp$2Scale(shiftQP1)

In some examples, a QP index for initializing equations 22 and 23 may be signaled through the bitstream in order to avoid parsing and processing dependencies. In some examples, video encoder 20 may estimate parameters for the proposed techniques described herein and signal those parameters to video decoder 30 through a bitstream (metadata, SEI message, VUI, or SPS/PPS or slice header, etc.). Video decoder 30 then receives the parameters from the bitstream. In some examples, video encoder 20 may derive the parameters of the proposed techniques. Video decoder 30 may implement a specified process from an input signal or from other available parameters associated with the input signal and perform the same derivation. In some examples, video encoder 20 may signal the parameters of proposed techniques explicitly to video decoder 30. In yet another example, video encoder 20 and video decoder 30 may derive the parameters from other input signal parameters, e.g. parameters of the input color gamut and target color container (color primaries).

Figure 10:
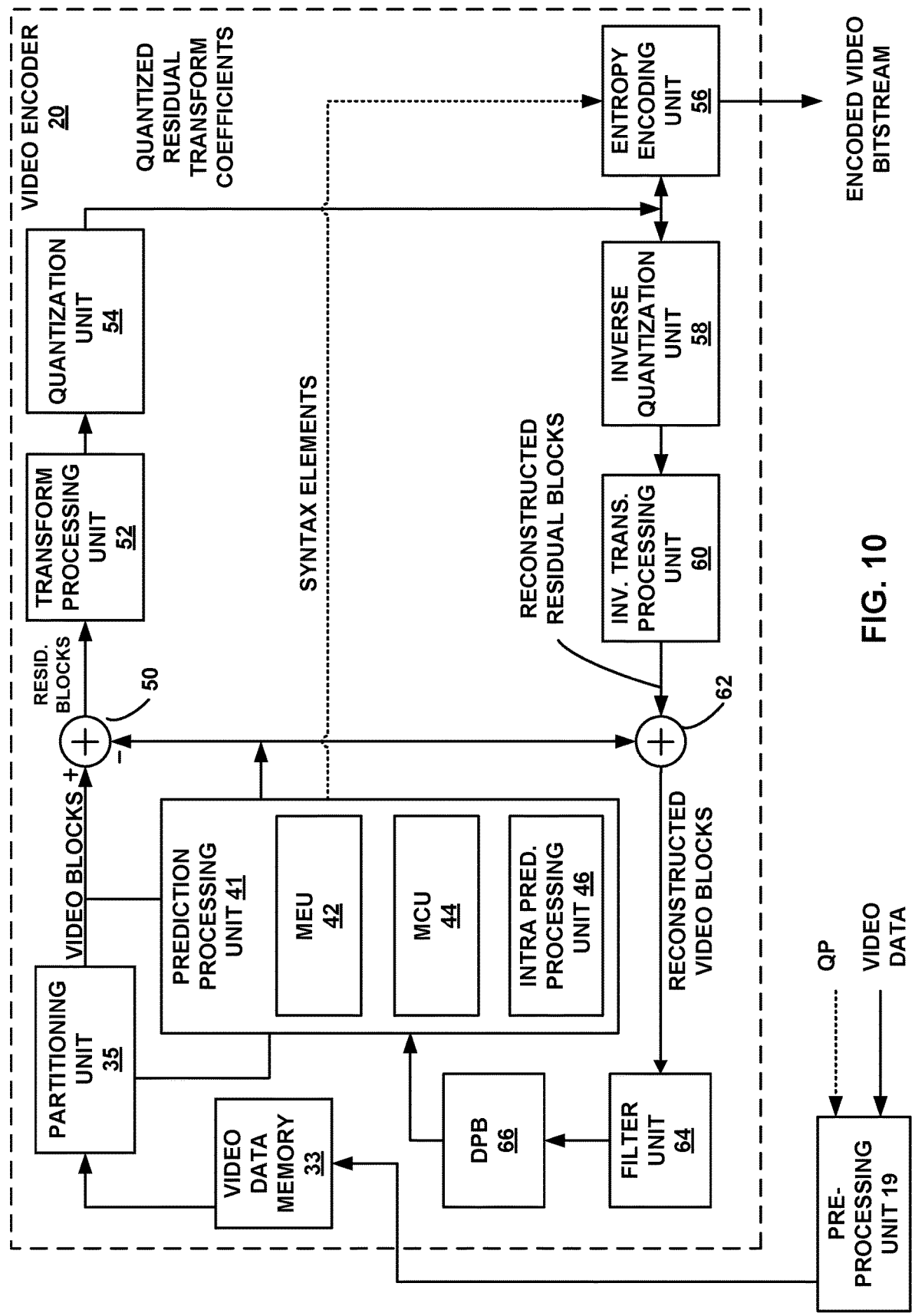
FIG. 10 is a block diagram illustrating an example video encoder that may implement the techniques described in this disclosure.

FIG. 10 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 10, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction processing unit 46. For video block reconstruction, video encoder 20 also includes inverse quantization unit 58, inverse transform processing unit 60, summer 62, filter unit 64, and decoded picture buffer (DPB) 66.

As shown in FIG. 10, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30 or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 is intended to represent one or more of a deblocking filter, a sample adaptive offset filter, and adaptive loop filter, or other types of filters. A deblock filter may, for example, apply deblocking filtering to filter block boundaries to remove blockiness artifacts from reconstructed video. A sample adaptive offset filter may apply offsets to reconstructed pixel values in order to improve overall coding quality. Additional loop filters (in loop or post loop) may also be used.

Various techniques described in this disclosure may be performed by video encoder 20 and/or pre-processing unit 19, either separately or in combination with one another. For example, video encoder 20 an/or pre-processing unit 19 may be configured to process HDR/WCG video data. Video encoder 20 and/or pre-processing unit 19 may be configured to determine a quantization parameter for quantized transform coefficients of a block of the HDR/WCG video data; inverse quantize the quantized transform coefficients based on the determined quantization parameter to determine dequantized transform coefficients; based on the dequantized transform coefficients, determine a block of residual values for the block of the HDR/WCG video data; based on the block of residual values, determine a reconstructed block for the block of the HDR/WCG video data; determine one or more DRA parameters for the block of the HDR/WCG video data; adjust the one or more DRA parameters based on the determined quantization parameter to determine one or more adjusted DRA parameters; and perform DRA on the reconstructed block of the HDR/WCG video data using the one or more adjusted DRA parameters.

Video encoder 20 an/or pre-processing unit 19 may additionally or alternatively be configured to determine a quantization parameter for quantized transform coefficients of a block of the HDR/WCG video data; quantize the quantized transform coefficients based on the determined quantization parameter to determine quantized transform coefficients; determine one or more DRA parameters for the block of the HDR/WCG video data based on the determined quantization parameter; and adjust the one or more DRA parameters based on the determined quantization parameter to determine one or more adjusted DRA parameters.

Figure 11:
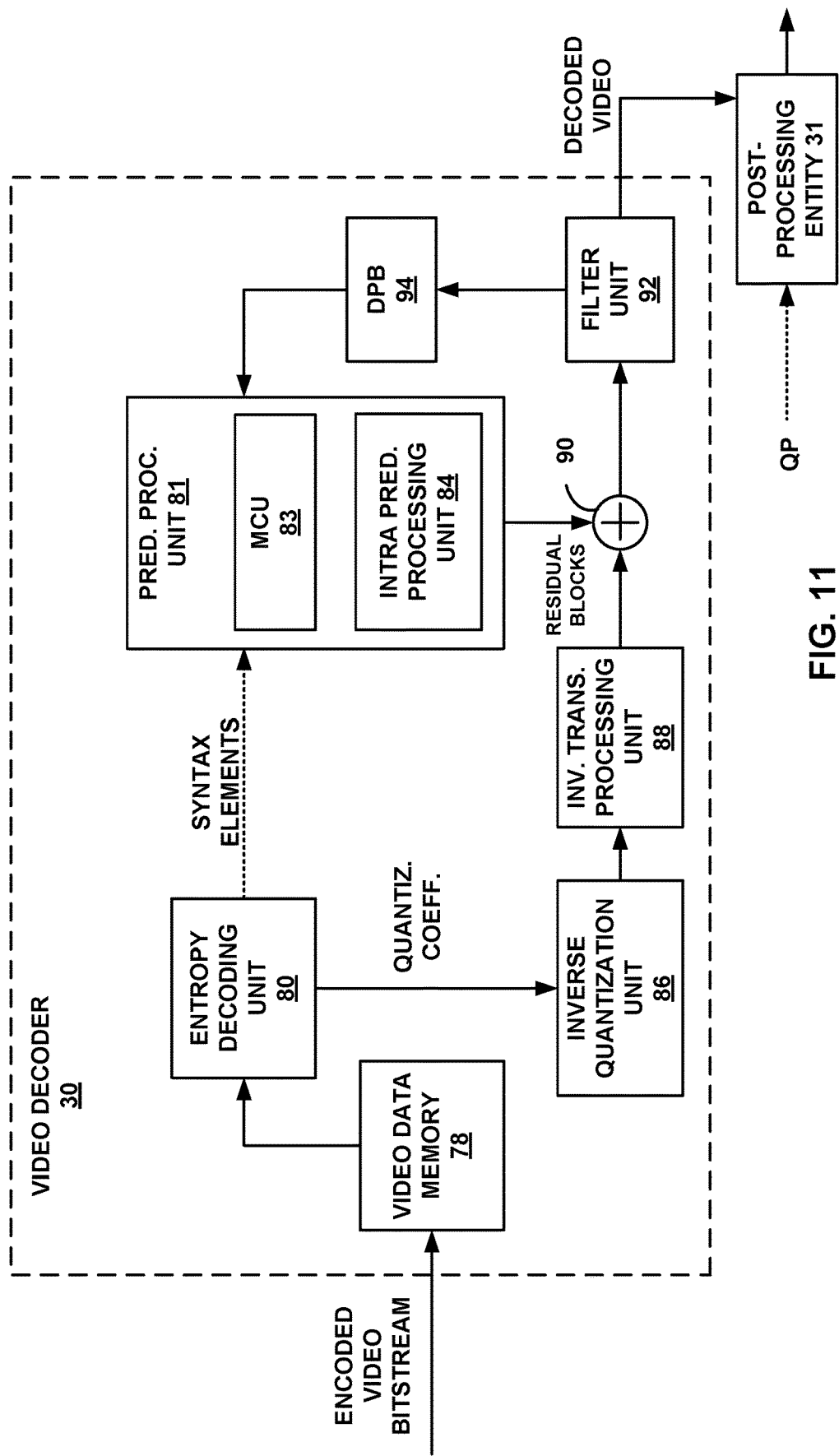
FIG. 11 is a block diagram illustrating an example video decoder that may implement the techniques described in this disclosure.

FIG. 11 is a block diagram illustrating an example video decoder 30 that may implement the techniques described in this disclosure. Video decoder 30 of FIG. 11 may, for example, be configured to receive the signaling described above with respect to video encoder 20 of FIG. 10. In the example of FIG. 11, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 10.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed video block using, for example, one or more of deblock filtering, SAO filtering, adaptive loop filtering, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Various techniques described in this disclosure may be performed by video decoder 30 and/or post-processing unit 31, either separately or in combination with one another. For example, video decoder 30 an/or post-processing unit 31 may be configured to process HDR/WCG video data. Video decoder 30 and/or post-processing unit 31 may be configured to determine a quantization parameter for quantized transform coefficients of a block of the HDR/WCG video data; inverse quantize the quantized transform coefficients based on the determined quantization parameter to determine dequantized transform coefficients; based on the dequantized transform coefficients, determine a block of residual values for the block of the HDR/WCG video data; based on the block of residual values, determine a reconstructed block for the block of the HDR/WCG video data; determine one or more DRA parameters for the block of the HDR/WCG video data; adjust the one or more DRA parameters based on the determined quantization parameter to determine one or more adjusted DRA parameters; and perform DRA on the reconstructed block of the HDR/WCG video data using the one or more adjusted DRA parameters.

Figure 12:
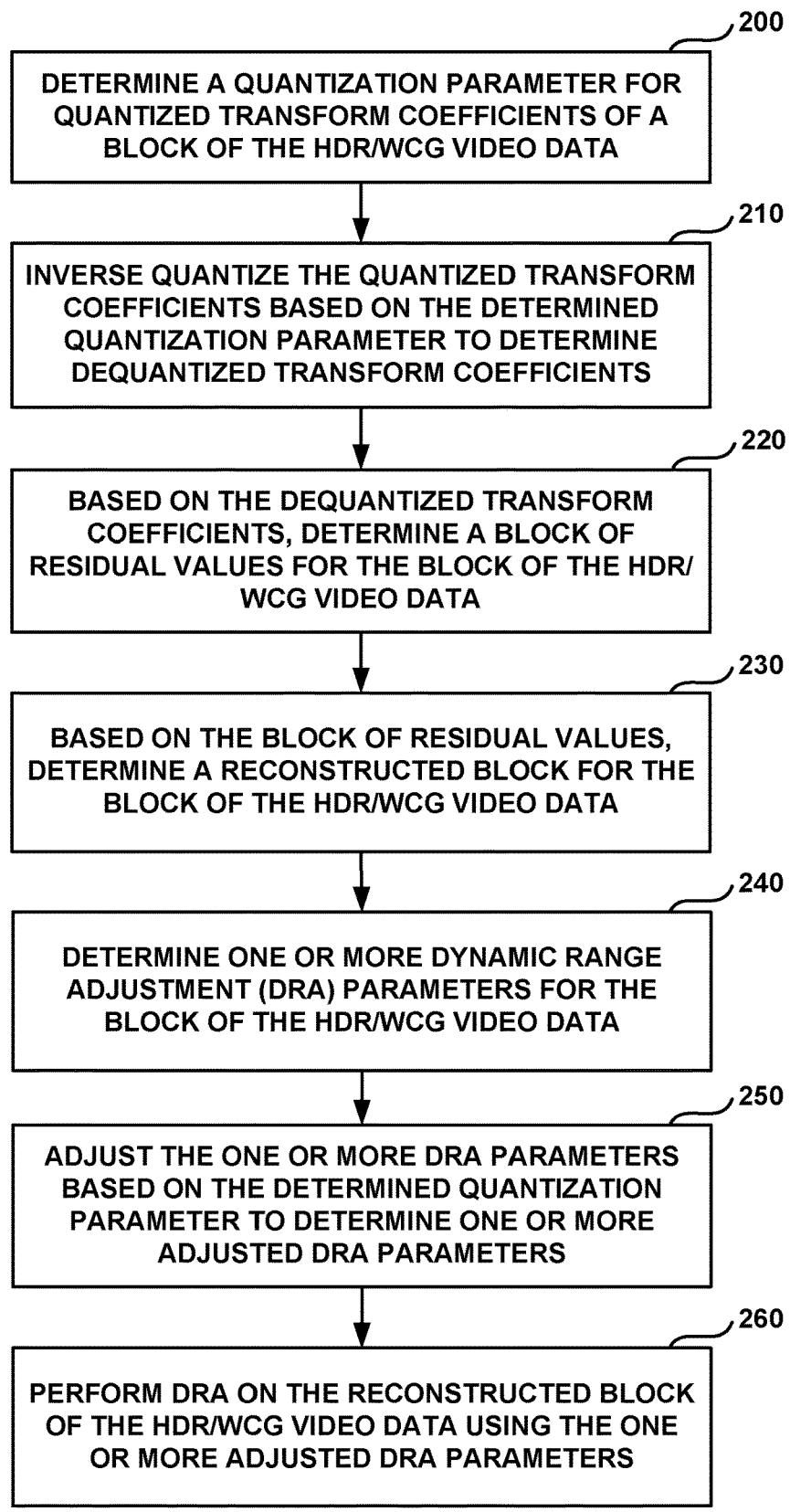
FIG. 12 is a flowchart illustrating an example operation of a video decoder for decoding video data in accordance with a technique of this disclosure.

FIG. 12 is a flowchart illustrating an example operation of a video decoder for decoding video data in accordance with a technique of this disclosure. The video decoder described with respect to FIG. 12 may, for example, be a video decoder, such as video decoder 30, for outputting displayable decoded video or may be a video decoder implemented in a video encoder, such as the decoding loop of video encoder 20, which includes prediction processing unit 41, inverse quantization unit 58, inverse transform processing unit 60, filter unit 64, and DPB 66. Some of the techniques of FIG. 12 may be performed by entities separate from the video decoder, such as pre-processing unit 19 or post-processing unit 31, but for simplicity, all the techniques of FIG. 12 will be described as being performed by the video decoder.

The video decoder determines a quantization parameter for quantized transform coefficients of a block of the HDR/WCG video data (200). The video decoder inverse quantizes the quantized transform coefficients based on the determined quantization parameter to determine dequantized transform coefficients (210). Based on the dequantized transform coefficients, the video decoder determines a block of residual values for the block of the HDR/WCG video data (220). Based on the block of residual values, the video decoder determines a reconstructed block for the block of the HDR/WCG video data (230). The video decoder determines one or more DRA parameters for the block of the HDR/WCG video data (240). To determine the one or more DRA parameters for the block of the HDR/WCG video data, the video decoder may receive indications of the one or more DRA parameters as syntax elements in the HDR/WCG video data or may otherwise derive the one or DRA parameters.

The video decoder adjusts the one or more DRA parameters based on the determined quantization parameter to determine one or more adjusted DRA parameters (250). The one or more DRA parameters for the block of the HDR/WCG video data may include a scaling parameter for a luma component of the block of the HDR/WCG video data and an offset parameter for the luma component of the block of the HDR/WCG video data, and the one or more adjusted DRA parameters for the block of the HDR/WCG video data may include an adjusted scaling parameter for the luma component of the block of the HDR/WCG video data and an adjusted offset parameter for the luma component of the block of the HDR/WCG video data. The one or more DRA parameters for the block of the HDR/WCG video data may include a scaling parameter for a chroma component of the block of the HDR/WCG video data and an offset parameter for the chroma component of the block of the HDR/WCG video data, and the one or more adjusted DRA parameters for the block of the HDR/WCG video data may include an adjusted scaling parameter for the chroma component of the block of the HDR/WCG video data and an adjusted offset parameter for the chroma component of the block of the HDR/WCG video data. The one or more adjusted DRA parameters may include an adjusted DRA parameter for a first chroma component of the block of the HDR/WCG video data and an adjusted DRA parameter for a second chroma component of the block of the HDR/WCG video data. The one or more adjusted DRA parameters may include an adjusted DRA parameter for a luma component of the block of the HDR/WCG video data, an adjusted DRA parameter for a first chroma component of the block of the HDR/WCG video data, and an adjusted DRA parameter for a second chroma component of the block of the HDR/WCG video data.

The video decoder performs DRA on the reconstructed block of the HDR/WCG video data using the one or more adjusted DRA parameters (260). The video decoder may also output the adjusted video data resulting from performing DRA. The video decoder may, for example, output the adjusted video data for display or may output the adjusted video data by storing the adjusted video data. The video decoder may store the adjusted video data for future display or may store the adjusted video data for encoding or decoding future blocks of video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing high dynamic range and/or wide color gamut (HDR/WCG) video data, the method comprising:

determining a quantization parameter for quantized transform coefficients of a block of the HDR/WCG video data;

inverse quantizing the quantized transform coefficients based on the determined quantization parameter to determine dequantized transform coefficients;

based on the dequantized transform coefficients, determining a block of residual values for the block of the HDR/WCG video data;

based on the block of residual values, determining a reconstructed block for the block of the HDR/WCG video data;

determining one or more dynamic range adjustment (DRA) parameters for the block of the HDR/WCG video data, wherein the one or more DRA parameters for the block of the HDR/WCG video data comprise a scaling parameter for a luma component of the block of the HDR/WCG video data and an offset parameter for the luma component of the block of the HDR/WCG video data;

adjusting the one or more DRA parameters based on the determined quantization parameter to determine one or more adjusted DRA parameters, wherein the one or more adjusted DRA parameters for the block of the HDR/WCG video data comprise an adjusted scaling parameter for the luma component of the block of the HDR/WCG video data and an adjusted offset parameter for the luma component of the block of the HDR/WCG video data; and performing DRA on the reconstructed block of the HDR/WCG video data using the one or more adjusted DRA parameters.

2. The method of claim 1, wherein the one or more DRA parameters for the block of the HDR/WCG video data further comprise a scaling parameter for a chroma component of the block of the HDR/WCG video data and an offset parameter for the chroma component of the block of the HDR/WCG video data, and wherein the one or more adjusted DRA parameters for the block of the HDR/WCG video data further comprise an adjusted scaling parameter for the chroma component of the block of the HDR/WCG video data and an adjusted offset parameter for the chroma component of the block of the HDR/WCG video data.

3. The method of claim 1, wherein the one or more adjusted DRA parameters further comprise an adjusted DRA parameter for a first chroma component of the block of the HDR/WCG video data and an adjusted DRA parameter for a second chroma component of the block of the HDR/WCG video data.

4. The method of claim 1, wherein the one or more adjusted DRA parameters further comprise an adjusted DRA parameter for a first chroma component of the block of the HDR/WCG video data and an adjusted DRA parameter for a second chroma component of the block of the HDR/WCG video data.

5. The method of claim 1, wherein determining the one or more DRA parameters for the block of the HDR/WCG video data comprises receiving indications of the one or more DRA parameters as syntax elements in the HDR/WCG video data.

6. The method of claim 1, wherein the reconstructed block of the HDR/WCG video data comprises a filtered version of the reconstructed block.

7. The method of claim 1, wherein determining the one or more DRA parameters for the block of the HDR/WCG video data comprises deriving at least one of the one or more DRA parameters for the block of the HDR/WCG video data based on a dependency between a quantization parameter for the luma component of the block of the HDR/WCG video data and a quantization parameter for a chroma component of the block of the HDR/WCG video data.

8. The method of claim 7, wherein deriving the at least one of the one or more DRA parameters for the block of the HDR/WCG video data based on the dependency between the quantization parameter for the luma component of the block of the HDR/WCG video data and the quantization parameter for the chroma component of the block of the HDR/WCG video data comprises deriving the at least one of the one or more DRA parameters by performing QP to DRA scale conversion.

9. The method of claim 7, wherein deriving the at least one of the one or more DRA parameters for the block of the HDR/WCG video data based on the dependency between the quantization parameter for the luma component of the block of the HDR/WCG video data and the quantization parameter for the chroma component of the block of the HDR/WCG video data comprises deriving the at least one of the one or more DRA parameters by performing DRA scale to QP conversion.

10. The method of claim 7, wherein the dependency between the quantization parameter for the luma component and the quantization parameter for the chroma component is defined by a codec.

11. The method of claim 7, the method further comprising:
receiving syntax elements in the HDR/WCG video data, wherein values for the syntax elements define the dependency between the quantization parameter for the luma component of the block of the HDR/WCG video data and the quantization parameter for the chroma component of the block of the HDR/WCG video data.

12. The method of claim 1, wherein the method of decoding is performed as part of an encoding process.

13. A device for processing high dynamic range and/or wide color gamut (HDR/WCG) video data, the device comprising:
a memory configured to store video data; and
one or more processors coupled to the memory and configured to:
determine a quantization parameter for quantized transform coefficients of a block of the HDR/WCG video data;
inverse quantize the quantized transform coefficients based on the determined quantization parameter to determine dequantized transform coefficients;
based on the dequantized transform coefficients, determine a block of residual values for the block of the HDR/WCG video data;
based on the block of residual values, determine a reconstructed block for the block of the HDR/WCG video data;
determine one or more dynamic range adjustment (DRA) parameters for the block of the HDR/WCG video data, wherein the one or more DRA parameters for the block of the HDR/WCG video data comprise a scaling parameter for a luma component of the block of the HDR/WCG video data and an offset parameter for the luma component of the block of the HDR/WCG video data;
adjust the one or more DRA parameters based on the determined quantization parameter to determine one or more adjusted DRA parameters, wherein the one or more adjusted DRA parameters for the block of the HDR/WCG video data comprise an adjusted scaling parameter for the luma component of the block of the HDR/WCG video data and an adjusted offset parameter for the luma component of the block of the HDR/WCG video data; and
perform DRA on the reconstructed block of the HDR/WCG video data using the one or more adjusted DRA parameters.

14. The device of claim 13, wherein the one or more DRA parameters for the block of the HDR/WCG video data further comprise a scaling parameter for a chroma component of the block of the HDR/WCG video data and an offset parameter for the chroma component of the block of the HDR/WCG video data, and wherein the one or more adjusted DRA parameters for the block of the HDR/WCG video data further comprise an adjusted scaling parameter for the chroma component of the block of the HDR/WCG video data and an adjusted offset parameter for the chroma component of the block of the HDR/WCG video data.

15. The device of claim 13, wherein the one or more adjusted DRA parameters further comprise an adjusted DRA parameter for a first chroma component of the block of the HDR/WCG video data and an adjusted DRA parameter for a second chroma component of the block of the HDR/WCG video data.

16. The device of claim 13, wherein the one or more adjusted DRA parameters further comprise an adjusted DRA parameter for a first chroma component of the block of the HDR/WCG video data and an adjusted DRA parameter for a second chroma component of the block of the HDR/WCG video data.

17. The device of claim 13, wherein to determine the one or more DRA parameters for the block of the HDR/WCG video data, the one or more processors are configured to receive indications of the one or more DRA parameters as syntax elements in the HDR/WCG video data.

18. The device of claim 13, wherein the reconstructed block of the HDR/WCG video data comprises a filtered version of the reconstructed block.

19. The device of claim 13, wherein to determine the one or more DRA parameters for the block of the HDR/WCG video data, the one or more processors are configured to derive at least one of the one or more DRA parameters for the block of the HDR/WCG video data based on a dependency between a quantization parameter for the luma component of the block of the HDR/WCG video data and a quantization parameter for a chroma component of the block of the HDR/WCG video data.

20. The device of claim 19, wherein to derive the at least one of the one or more DRA parameters for the block of the HDR/WCG video data based on the dependency between the quantization parameter for the luma component of the block of the HDR/WCG video data and the quantization parameter for the chroma component of the block of the HDR/WCG video data, the one or more processors are configured to derive the at least one of the one or more DRA parameters by performing QP to DRA scale conversion.

21. The device of claim 19, wherein to derive the at least one of the one or more DRA parameters for the block of the HDR/WCG video data based on the dependency between the quantization parameter for the luma component of the block of the HDR/WCG video data and the quantization parameter for the chroma component of the block of the HDR/WCG video data, the one or more processors are configured to derive the at least one of the one or more DRA parameters by performing DRA scale to QP conversion.

22. The device of claim 19, wherein the dependency between the quantization parameter for the luma component and the quantization parameter for the chroma component is defined by a codec.

23. The device of claim 19, wherein the one or more processors are further configured to:
receive syntax elements in the HDR/WCG video data, wherein values for the syntax elements define the dependency between the quantization parameter for the luma component of the block of the HDR/WCG video data and the quantization parameter for the chroma component of the block of the HDR/WCG video data.

24. The device of claim 13, wherein the device comprises a wireless communication device, further comprising a receiver configured to receive encoded video data.

25. The device of claim 24, wherein the wireless communication device comprises a telephone handset and wherein the receiver is configured to demodulate, according to a wireless communication standard, a signal comprising the encoded video data.

26. The device of claim 13, wherein the device comprises a wireless communication device, further comprising a transmitter configured to transmit encoded video data.

27. The device of claim 26, wherein the wireless communication device comprises a telephone handset and wherein the transmitter is configured to modulate, according to a wireless communication standard, a signal comprising the encoded video data.

28. A non-transitory computer readable medium storing instructions that when executed by one or more processors cause the one or more processors to:
determine a quantization parameter for quantized transform coefficients of a block of high dynamic range and/or wide color gamut (HDR/WCG) video data;
inverse quantize the quantized transform coefficients based on the determined quantization parameter to determine dequantized transform coefficients;
based on the dequantized transform coefficients, determine a block of residual values for the block of the HDR/WCG video data;
based on the block of residual values, determine a reconstructed block for the block of the HDR/WCG video data;
determine one or more dynamic range adjustment (DRA) parameters for the block of the HDR/WCG video data, wherein the one or more DRA parameters for the block of the HDR/WCG video data comprise a scaling parameter for a luma component of the block of the HDR/WCG video data and an offset parameter for the luma component of the block of the HDR/WCG video data;
adjust the one or more DRA parameters based on the determined quantization parameter to determine one or more adjusted DRA parameters, wherein the one or more adjusted DRA parameters for the block of the HDR/WCG video data comprise an adjusted scaling parameter for the luma component of the block of the HDR/WCG video data and an adjusted offset parameter for the luma component of the block of the HDR/WCG video data; and
perform DRA on the reconstructed block of the HDR/WCG video data using the one or more adjusted DRA parameters.

29. An apparatus for processing high dynamic range and/or wide color gamut (HDR/WCG) video data, the device comprising:
means for determining a quantization parameter for quantized transform coefficients of a block of the HDR/WCG video data;
means for inverse quantizing the quantized transform coefficients based on the determined quantization parameter to determine dequantized transform coefficients;
means for determining a block of residual values for the block of the HDR/WCG video data based on the dequantized transform coefficients;
means for determining a reconstructed block for the block of the HDR/WCG video data based on the block of residual values;
means for determining one or more dynamic range adjustment (DRA) parameters for the block of the HDR/WCG video data, wherein the one or more DRA parameters for the block of the HDR/WCG video data comprise a scaling parameter for a luma component of the block of the HDR/WCG video data and an offset parameter for the luma component of the block of the HDR/WCG video data;
means for adjusting the one or more DRA parameters based on the determined quantization parameter to determine one or more adjusted DRA parameters, wherein the one or more adjusted DRA parameters for the block of the HDR/WCG video data comprise an adjusted scaling parameter for the luma component of the block of the HDR/WCG video data and an adjusted offset parameter for the luma component of the block of the HDR/WCG video data; and
means for performing DRA on the reconstructed block of the HDR/WCG video data using the one or more adjusted DRA parameters.

* * * * *